(12) United States Patent
Nunez

(10) Patent No.: US 11,074,730 B1
(45) Date of Patent: Jul. 27, 2021

(54) AUGMENTED REALITY DIAGNOSTIC TOOL FOR DATA CENTER NODES

(71) Applicant: NetApp, Inc., Sunnyvale, CA (US)

(72) Inventor: Michael Keith Nunez, Lyons, CO (US)

(73) Assignee: NetApp, Inc., San Jose, CA (US)

(*) Notice: Subject to any disclaimer, the term of this patent is extended or adjusted under 35 U.S.C. 154(b) by 28 days.

(21) Appl. No.: 16/750,721

(22) Filed: Jan. 23, 2020

(51) Int. Cl.
*G06T 11/20* (2006.01)
*G06T 19/00* (2011.01)
*H04L 29/08* (2006.01)

(52) U.S. Cl.
CPC .......... *G06T 11/206* (2013.01); *G06T 11/203* (2013.01); *G06T 19/006* (2013.01); *H04L 67/10* (2013.01)

(58) Field of Classification Search
CPC ... G06T 11/206; G06T 19/006; G06T 11/203; H04L 67/10
See application file for complete search history.

(56) References Cited

U.S. PATENT DOCUMENTS

| | | | |
|---|---|---|---|
| 6,681,164 B2 | 1/2004 | Bergerhoff et al. | |
| 6,870,846 B2 | 3/2005 | Cain | |
| 8,760,471 B2 | 6/2014 | Ihara et al. | |
| 9,235,819 B2 | 1/2016 | Torii et al. | |
| 9,495,236 B2 | 11/2016 | Monk | |
| 9,712,413 B2 | 7/2017 | Windell | |
| 9,846,996 B1 | 12/2017 | Moore | |
| 10,902,263 B1 * | 1/2021 | Angel | G06K 9/00671 |
| 2014/0278053 A1 | 9/2014 | Wu et al. | |
| 2016/0140868 A1 | 5/2016 | Lovett et al. | |

(Continued)

FOREIGN PATENT DOCUMENTS

| | | | |
|---|---|---|---|
| CN | 106773709 A | 5/2017 | |
| CN | 106899599 A | 6/2017 | |

(Continued)

OTHER PUBLICATIONS

Berning M., et al., "Augmented Service in the Factory of the Future", Jun. 2012, 2 pages.

(Continued)

*Primary Examiner* — William A Beutel
(74) *Attorney, Agent, or Firm* — Jaffery Watson Mendonsa & Hamilton LLP

(57) ABSTRACT

An augmented reality (AR) diagnostic tool embodied as a software application on a portable device employs AR infrastructure to enable a user to locate a failed/malfunctioning node of a cluster and, with minimal interaction, diagnose causes and provide recommendations to repair the node. The portable device may be a computer embodied as visualization technology and configured to execute the software application. Once installed, the AR diagnostic (ARD) tool is ready for use by the user, e.g., a customer service technician, to locate and repair one or more failed cluster nodes. In response to a failure/malfunction, the cluster node sends diagnostic and configuration information (i.e., failure/malfunction information) of the failed node to an analytics service. The failure information informs the technician of the cluster failure. The technician may then activate the ARD tool and AR infrastructure to locate and repair the failed node.

20 Claims, 5 Drawing Sheets

(56) References Cited

U.S. PATENT DOCUMENTS

| | | | |
|---|---|---|---|
| 2016/0204879 A1* | 7/2016 | Niewczas | H04B 11/00 |
| | | | 455/41.1 |
| 2016/0253563 A1 | 9/2016 | Lam et al. | |
| 2017/0076365 A1 | 3/2017 | D'Souza et al. | |
| 2017/0091607 A1* | 3/2017 | Emeis | G06T 19/006 |
| 2018/0089042 A1* | 3/2018 | Demetriou | G06N 5/022 |
| 2019/0244425 A1 | 8/2019 | Koohmarey | |
| 2019/0287316 A1 | 9/2019 | Crawley et al. | |

FOREIGN PATENT DOCUMENTS

| | | |
|---|---|---|
| CN | 108879440 A | 11/2018 |
| CN | 109459635 A | 3/2019 |
| CN | 106340217 B | 5/2019 |
| CN | 110058981 A | 7/2019 |
| EP | 1550318 B1 | 12/2009 |
| EP | 2784681 A1 | 10/2014 |
| KR | 20130101202 A | 9/2013 |
| WO | 2018170393 A9 | 11/2018 |
| WO | 2019173677 A1 | 9/2019 |

OTHER PUBLICATIONS

Cisco., "Deploy Hyperconvergence Anywhere Your Business Goes", Sep. 18, 2019, 19 pages.

Dell EMC., "Understanding Augmented Reality Monitoring in OpenManage Mobile", Oct. 2019, 10 pages.

Fraga-Lamas P., et al., "A Review on Industrial Augmented Reality Systems for the Industry 4.0 Shipyard", IEEE, Feb. 2018, vol. X, 18 pages.

Nutanix., "Monitoring Nutanix Hyper-Converged Infrastructure", 2019.

Re'Flekt., "Augmented Reality Platform for Enterprises Maintenance , Operations ,Training", 2019.

Sato K., et al., "Visualization and Management Platform with Augmented Reality for Wireless Sensor Networks", Wireless Sensor Network, Jan. 19, 2015, vol. 7, pp. 1-11.

Wojcicki T., "Supporting the Diagnostics and the Maintenance of Technical Devices With Augmented Reality", Diagnostyka, vol. 15(1), 2014, pp. 43-47.

* cited by examiner

AUGMENTED REALITY DIAGNOSTIC TOOL FOR DATA CENTER NODES

BACKGROUND

Technical Field

The disclosure generally relates to diagnostics for nodes of a data center and, more specifically, to a diagnostic tool used to diagnose and repair failures of nodes in the data center.

Background Information

A conventional enterprise configuration used to run modern applications typically consists of a large number of compute, storage, and networking elements organized in a data center architecture. Such an architecture may include, among other things, Hyper Converged Infrastructure (HCI) systems that converge these three separate elements into a single unified system of nodes deployed as an HCI cluster so as to maintain the various is elements from one location.

However, maintaining and administering such systems on a large data center scale is challenging due to sheer geographic dispersion and quantity of elements. To that end, sophisticated diagnostic tools that enhance reliability and ease maintenance with advanced, yet easy-to-use analysis and visualization differentiate over competing vendor offerings. An aspect of such differentiation may include dramatically simplifying fault detection of one or more nodes within the data center. Specifically, it may be desirable to provide a tool for use by a user, e.g., a customer service field technician, to quickly locate a failed node within a customer's data center, diagnose the failure, and obtain resolution in real time. Operation of the tool should be easy so that the customer service technician will use the tool for "self-diagnosis" of cluster node failure, rather than call support for initial assessment of the root cause of the failure. Operation of the tool should further be clear regarding the steps for problem discovery and subsequent guidance of the technician through these steps. The resulting effect of the tool is to reduce the number of support engagements, thus making the product easier to support as well as to rapidly assess root problem causes.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

The embodiments described herein are directed to an augmented reality (AR) diagnostic tool embodied as a software application on a portable device that employs AR infrastructure to enable a user to locate a failed or malfunctioning node of an HCI cluster in a customer data center and, with minimal interaction, diagnose causes and provide recommendations to functionally and quickly repair the failed or malfunctioning node. The portable device may be a computer embodied as wearable visualization technology and configured to execute the software application that is installable from a vendor-specific web site or cloud provider. Once installed, the software application transforms the portable device into the AR diagnostic (ARD) tool that is ready for use by the user, e.g., a customer service technician, in the data center to locate and repair one or more failed cluster nodes. In response to a suspected failure, the cluster node sends diagnostic and configuration information (i.e., failure/malfunction information), including a node identifier (ID), of the failed, malfunctioning, or sub-optimally operating node to a cloud-based analytics service of the vendor-specific cloud provider. The failure information also notifies the technician of the HCI cluster as to the node failure, malfunction, or suboptimal operation using, e.g., the node ID of the failed node. The technician may then activate the ARD tool and AR infrastructure to locate and repair the node.

Advantageously, the ARD tool and AR infrastructure improves reliable operation of the cluster and reduces down time, as well as rectifies suboptimal operation, such as increasing network throughput by alleviating otherwise unforeseen bottlenecks based on information from the analytics service.

DESCRIPTION

Figure 1:
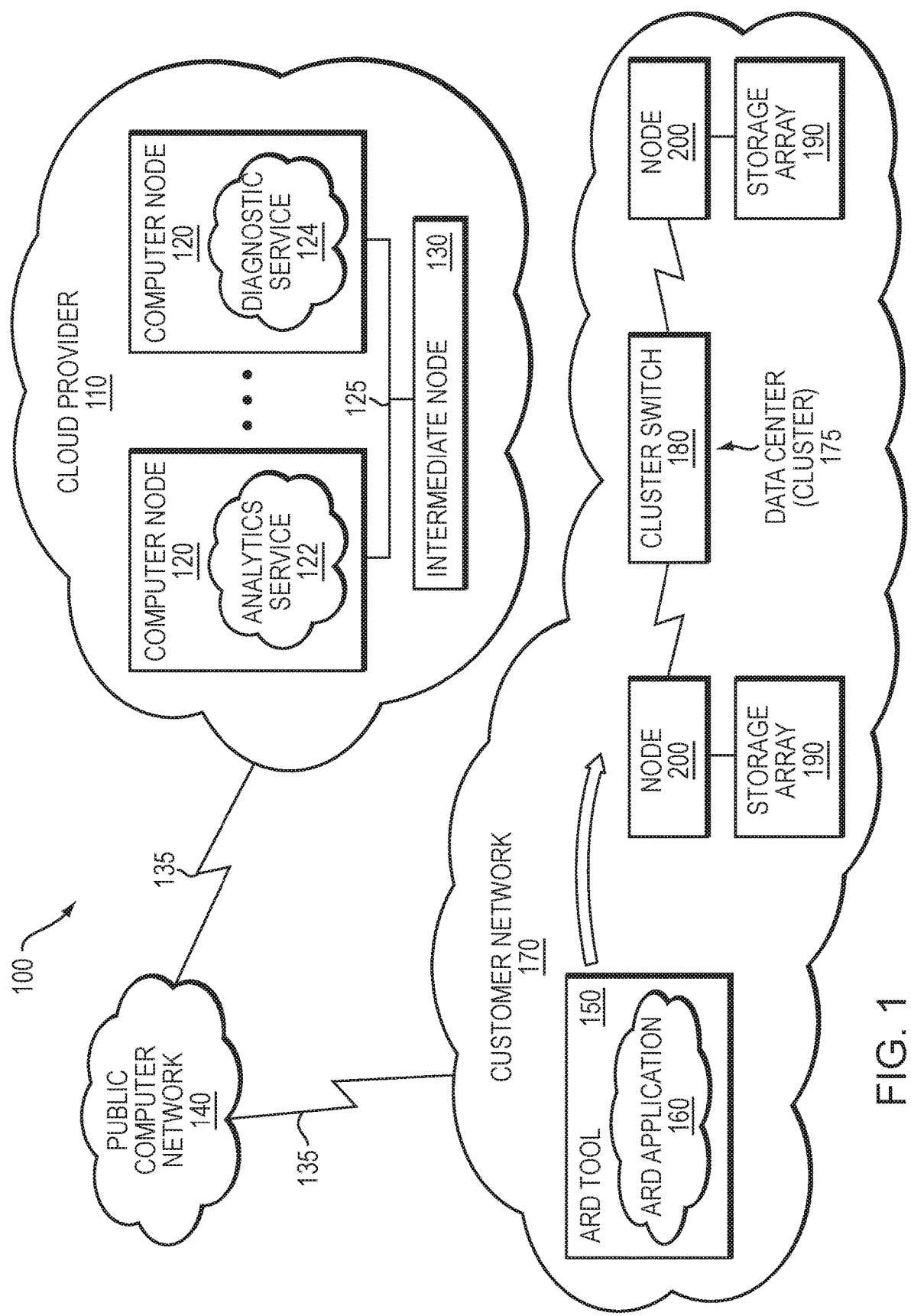
FIG. 1 is a block diagram of a computing environment having a cloud provider connected to a private customer network via a public computer network.

FIG. 1 is a block diagram of a computing environment 100 having a cloud provider 110 connected to a customer network 170 via a public computer network 140. The cloud provider 110 illustratively includes one or more computer nodes 120 and intermediate nodes 130 deployed as a vendor-specific web site or "cloud" such as, e.g., with deployments from NetApp Cloud Central. The cloud provider 110 may be configured to provide services, such as a cloud-based analytics service 122 and diagnostic service 124, that are accessible to the customer network 170 over the public computer network 140, such as the Internet. Each computer node 120 is illustratively embodied as a computer system having interconnected processor(s), main memory, storage adapter(s), and network adapter(s). The network adapter connects the computer node 120 to other computer nodes 120 of the cloud provider 110 over local network segments 125 illustratively embodied as shared local area networks (LANs) or virtual LANs (VLANs).

The intermediate node 130 may be embodied as a network switch, router, or virtual private network (VPN) gateway that interconnects the LAN/VLAN local segments 125 with remote network segments 135 illustratively embodied as point-to-point links, wide area networks (WANs), and/or VPNs implemented over the public network 140, such as the Internet, and further connect to the private customer network 170. Communication over the network segments 125, 135 may be effected by exchanging discrete frames or packets of data according to pre-defined protocols, such as the Transmission Control Protocol/Internet Protocol (TCP/IP) and the OpenID Connect (OIDC) protocol, although other protocols, such as the User Datagram Protocol (UDP) or the HyperText Transfer Protocol Secure (HTTPS) may also be advantageously employed.

Illustratively, the customer network 170 may be configured as a Hyper Converged Infrastructure (HCI) cluster of nodes 200 deployed in a data center 175. The nodes 200 may be configured to provide various services, such compute, storage and management services, for information, i.e., data and metadata, organized and stored on storage devices of the cluster. To that end, the nodes 200 include storage and compute nodes organized as the HCI cluster to provide a distributed storage architecture configured to service storage requests issued by one or more clients of the cluster. The compute nodes include hardware resources, such processors, memory and networking, to provide compute services in a deployment of the cluster, while the storage nodes include such hardware resources, along with storage, to provide data storage and management services in the cluster. The nodes 200 may be interconnected by one or more cluster network switches 180 and include functional components that cooperate to provide a distributed, scale-out storage architecture of the cluster. The components of each node 200 include hardware and software functionality that enable the node to connect to and service one or more clients over the public computer network 140, as well as to a storage array 190 of storage devices, to thereby render the services in accordance with the distributed storage architecture.

The embodiments described herein are directed to an augmented reality (AR) diagnostic tool 150 embodied as a software application on a portable device that employs AR infrastructure to enable a user to locate a failed node of the HCI cluster in the customer data center 175 and, with minimal interaction, diagnose causes and provide recommendations to functionally and quickly repair the failed node (i.e., get back online). The portable device may be a computer embodied as wearable visualization technology (e.g., a hand-held smart phone, AR glasses, AR contact lenses, or include an AR visualization device as a peripheral) and configured to execute the software application, e.g., an AR diagnostic (ARD) application 160, that is installable from the cloud provider 110 or other software delivery (e.g., compact disc). Once installed, the ARD application 160 transforms the portable device into the ARD tool 150 that is ready for use by the user, e.g., a customer service technician, an administrator or technician of the data center, in the data center 175 to locate and repair one or more failed cluster nodes. In response to a failure, malfunction or suboptimal operation the cluster node sends diagnostic and configuration information (i.e., failure/malfunction information), including a node identifier (ID), of the failed node to the cloud-based analytics service 122 of the cloud provider 110. As used herein, failure and/or malfunction information includes diagnostic is and configuration information, including a node ID, of a node that may have failed or that may be operating outside of one or more specified norms (e.g., deemed malfunctioning or operating sub-optimally according to one or more reference parameters), but may still be functioning and capable of communication. The failure information also notifies the technician of the HCI cluster node failure using, e.g., the node ID of the failed node. The technician may then activate the ARD tool 150 and AR infrastructure to locate and repair the failed node.

Figure 2:
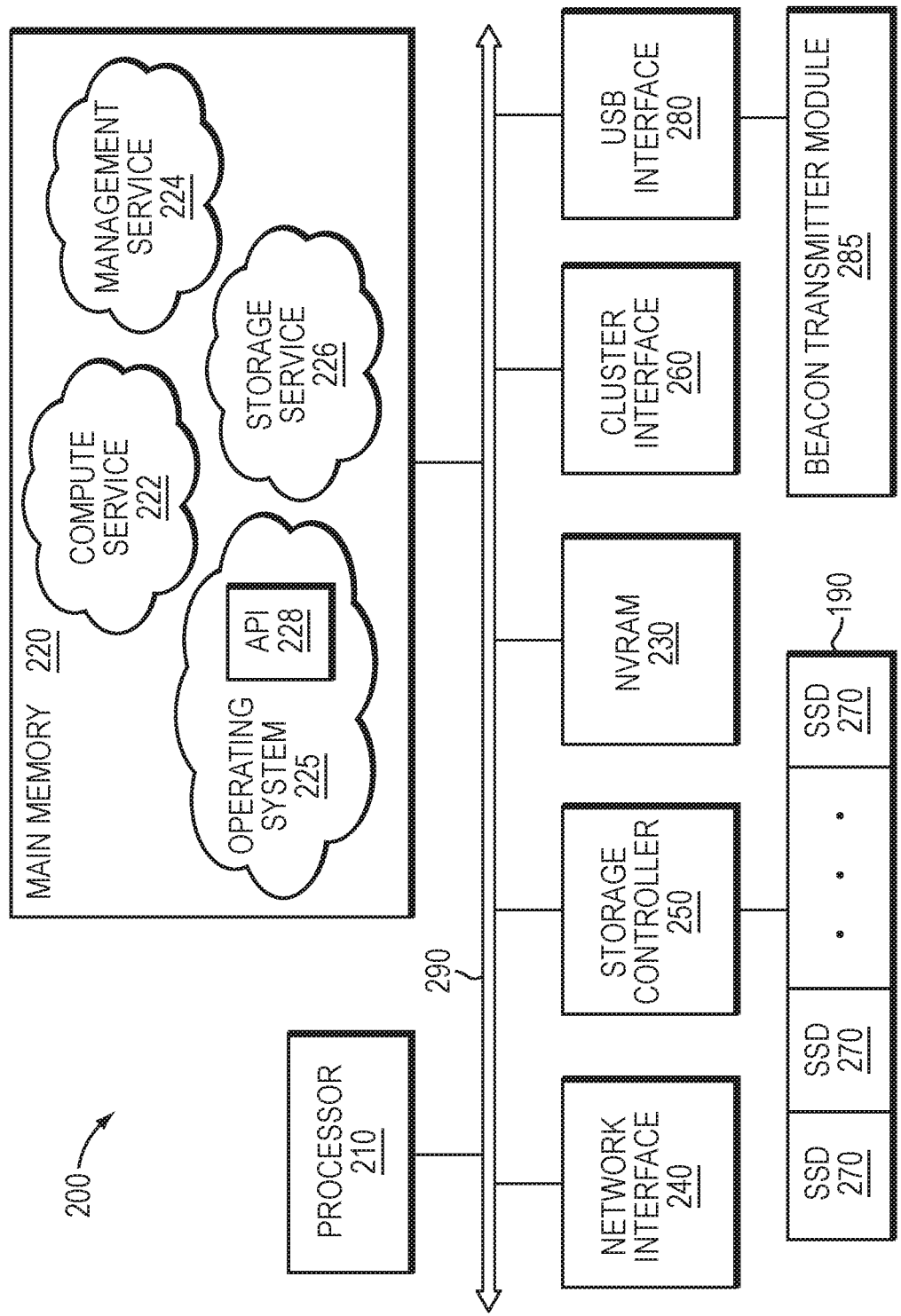
FIG. 2 is block diagram of a node of a cluster deployed in the private customer network.

FIG. 2 is a block diagram of a node 200 illustratively embodied as a computer system having one or more processing units (processors) 210, a main memory 220, a non-volatile random access memory (NVRAM) 230, one or more network interfaces 240, one or more storage controllers 250, one or more cluster interfaces 260, and a USB interface 280 coupled to a beacon transmitter module 285, all of which are interconnected by a system bus 290. In other embodiments, the beacon transmitter may be a stand-alone device within a chassis of the node (e.g., a battery-powered emitter) and not communicably coupled to the node. The network interface 240 may include one or more ports adapted to couple the node 200 to the client(s) over computer network 140, which may include point-to-point links, wide area networks, virtual private networks implemented over the public network (Internet) or a shared local area network. The network interface 240 thus includes the mechanical, electrical and signaling circuitry needed to connect the node to the network 140, which may embody an Ethernet network.

The main memory 220 may include memory locations that are addressable by the processor 210 for storing software programs and data structures associated with the embodiments described herein. The processor 210 may, in turn, include processing elements and/or logic circuitry configured to execute the software programs, such as compute service 222, data management service 224, and storage service 226, and manipulate the data structures. An operating system 225, portions of which are typically resident in memory 220 and executed by the processing elements (e.g., processor 210), functionally organizes the node by, inter alia, invoking operations in support of the services implemented by the node. To that end, the operating system 225 includes an application programming interface (API) 228 for servicing requests, illustratively issued is as system calls, from applications, such as ARD application 160. A suitable operating system 225 may include a general-purpose operating system, such as the UNIX® series, the Linux® operating system, the FreeBSD® operating system (and the like) or Microsoft Windows® series of operating systems, or an operating system with configurable functionality such as microkernels and embedded kernels. It will be apparent to those skilled in the art that other processing and memory means, including various computer readable media, may be used to store and execute program instructions pertaining to the embodiments herein.

The storage controller 250 cooperates with the services implemented on the node 200 to access information requested by the client. The information is preferably stored on storage devices such as solid-state drives (SSDs) 270, illustratively embodied as flash storage devices, of storage array 190. Note that any applicable storage media, such as magnetic disk drives, may be used. In an embodiment, the flash storage devices may be block-oriented devices (i.e., drives accessed as blocks) based on NAND flash components, e.g., single-level-cell (SLC) flash, multi-level-cell (MLC) flash or triple-level-cell (TLC) flash, although it will be understood to those skilled in the art that other block-oriented, non-volatile, solid-state electronic devices (e.g., drives based on storage class memory components) may be advantageously used with the embodiments described herein. The storage controller 250 may include one or more ports having I/O interface circuitry that couples to the SSDs 270 over an I/O interconnect arrangement, such as a conventional serial attached SCSI (SAS), serial ATA (SATA) topology, and Peripheral Component Interconnect (PCI) express.

Each cluster interface 260 may include one or more ports adapted to couple the node 200 to the other node(s) of the data center 175. In an embodiment, a plurality of Ethernet ports (e.g., 10 Gbps) included in the one or more interfaces may be used for internode (or client) communication, although it will be apparent to those skilled in the art that other types of protocols and interconnects may be utilized within the embodiments described herein. The NVRAM 230 may include a back-up battery or other built-in last-state retention capability (e.g., non-volatile semiconductor memory such as storage class memory) that is capable of maintaining data in light of a failure to the node is and cluster environment.

Figure 3:
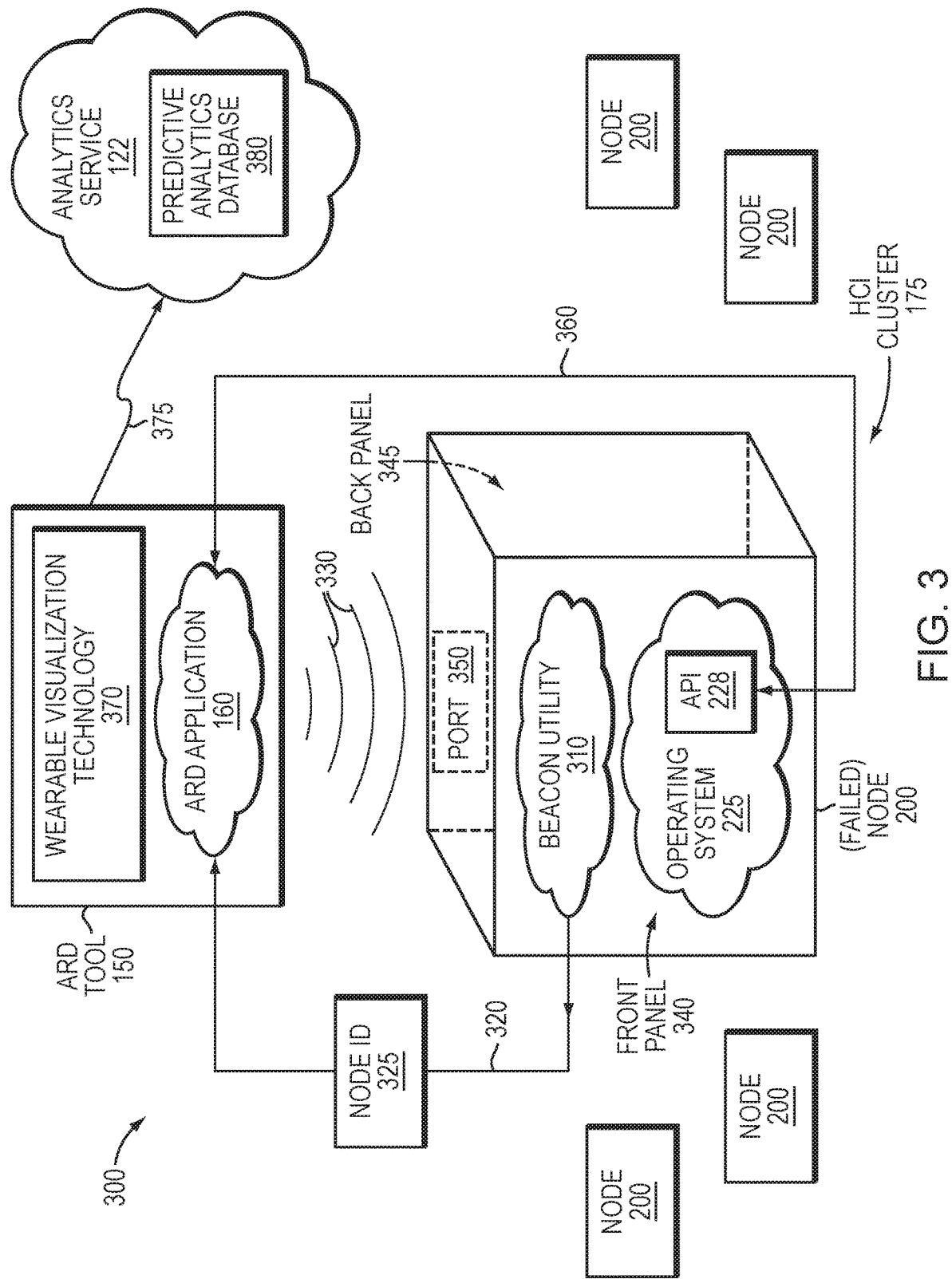
FIG. 3 illustrates an example workflow of an augmented reality diagnostic (ARD) is tool configured to locate, diagnose and provide recommendations to repair a failed node of the cluster.

FIG. 3 illustrates an example workflow 300 of the ARD tool 150 configured to employ AR infrastructure to locate, diagnose and provide recommendations to repair a failed node 200 of the HCI cluster 175 in the customer data center. Prior to shipment, each node 200 of the HCI cluster 175 is equipped with a beacon (e.g., iBeacon) utility 310 that is installed and programmed with the node's ID 325. The beacon utility 310 may interact with the beacon transmitter module 285 to operate as a slow, steady transmitter of a beacon signal 320, in response to a failure or malfunction of a node. In response to a failure, malfunction or suboptimal operation of a node, the activated ARD tool 150 may detect the transmitted beacon signal 320 and employ the node ID 325 to locate the specific failed node 200 in accordance with a proximity analysis feature of the AR infrastructure. In an embodiment, the beacon operates continuously whether the node is failed or not. Notably, as used herein a "failed node" includes nodes that are operating outside of one or more specified norms (e.g., deemed malfunctioning or operating sub-optimally according to one or more reference parameters), but may still be functioning and capable of communication. Such proximity analysis enables location of the failed node in the data center 175 from a typical in-building distance (e.g., 200 m). Illustratively, each beacon transmitter 285 has a locator range of approximately 70 meters (standard) to 450 meters (long range).

Upon detection of the beacon signal indicating the HCI node failure, the technician activates the ARD application 160, authenticates into the HCI cluster 175, and inputs the failed node ID 325. Illustratively, the ARD tool 150 operates as a receiver/locater for a specific beacon utility 310 with a specific node ID 325. The application 160 guides (e.g., visually, auditorily, or haptically) the technician in the direction of the transmitted beacon signal 320. In an embodiment, the ARD tool 150 further invokes the proximity analysis feature to direct the technician to the specific location of the failed node 200 in the data center 175 by emitting an increasingly repeated, higher audible 'peep' sound 330 as the technician arrives proximally closer to the node 200. In an embodiment, the proximity analysis feature is based on determining a relative detected signal strength of the beacon signal. For example, when arriving is within one-foot proximity, the higher frequency audible 'peep' sound 330 rapidly repeats indicating the technician has located the failed node 200. In other embodiments, increasingly repeated cues, such as visual indicators and/or haptic pulses, are used to communicate greater proximity to the failed node.

The ARD tool 150 may then invoke an image detection feature of the AR infrastructure to detect one or more suspect components of the node 200 that may be the cause of the failure. In an embodiment, image detection may be implemented by rendering a digital image (e.g., jpeg) of the outer perimeter of the node, such as the front panel 340 and back panel 345 of the node. The ARD application 160 may be "trained," e.g., using conventional machine learning techniques, to identify components visible in and interfaces accessible from the panels of the node. For example, the application 160 may be trained to identify one or more network ports 350 protruding through the back panel 345 of the node 200 and configured to connect the node to one or more clients over the computer network 140 or to the cluster (network) switch 180 of the cluster 175.

The image detection feature may also allow the ARD application 160 of the ARD tool 150 to "lock," i.e., identify the type of component and specific instance of the component within the node (e.g., a 1 Gbps ethernet port, identified as device "/dev/igb0" by the operating system of the node) onto the component of the failed node using the node ID 325 and thereafter issue system calls, such as API calls 360 (e.g., using the identifier for the component), to the API 228 of the operating system 225 of the node to request information, such as configuration, performance and historical parameters, about the component. For example, the ARD application 160 may lock onto the network port 350 and issue an API call 360 to the operating system 225 requesting information pertaining to data "velocity rate" (e.g., input/output data transfer per second) parameters of the network port 350. The requested information may then be transmitted to the ARD application 160 and displayed as diagnostic information on the wearable visualization technology (e.g., AR screen, AR lens) of the ARD tool 150 in accordance with a visualization feature of the AR infrastructure. Notably, an image recognition database is is maintained for each type of component for the node back panels and correlated with a back panel layout for each type of node as well as component identification for the operating system of the node.

Figure 4:
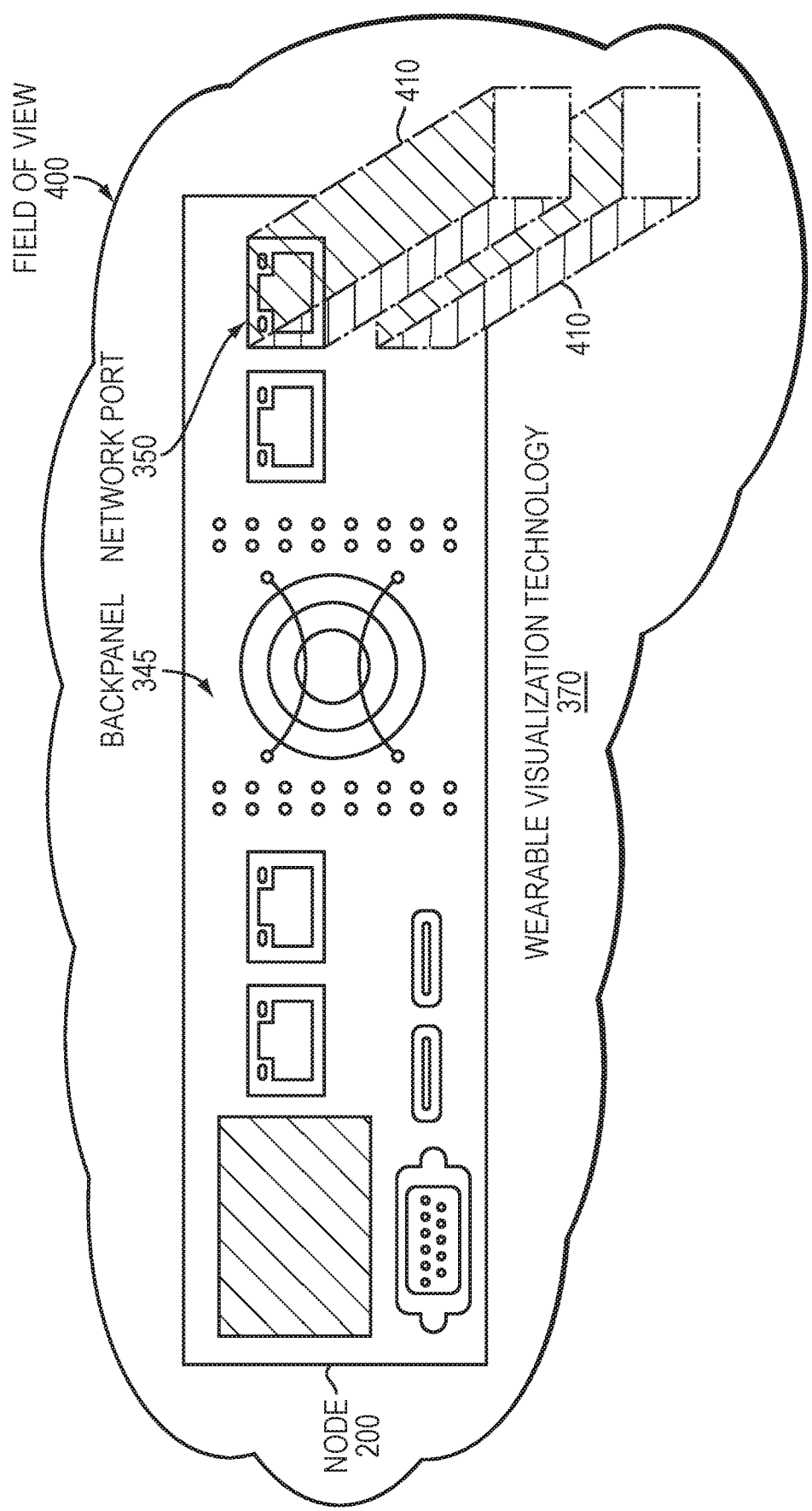
FIG. 4 is an example rendering of information displayed as a visual overlay on wearable visualization technology of the ARD tool.

FIG. 4 is an example rendering of information displayed as a visual overlay on the wearable visualization technology of the ARD tool. Illustratively, the data velocity rates of the network port 350 requested by the ARD application 160 may be rendered as a visual overlay disposed over an image of the back panel 345 of the node 200 and displayed as diagnostic information on the wearable visualization technology 370 of the ARD tool within a field of view 400 of the technician. Notably the image of the back panel may be rendered digitally on a screen and/or seen through a field of view lens included as part of the ARD tool. The visualization feature of the AR infrastructure may render the information in various geometric shapes and dimensions, as well as colors as one or more false color mappings depicting relative magnitudes or features of the information being displayed. For example, the data velocity rates may be rendered as 3-dimensional (3D) bar charts 410 indicating how fast data is flowing through the network port 350. The visual rendering may be further depicted (e.g., color-coded, shaped coded) to represent parameters of the component (e.g., data velocities of network port 350) at various predetermined units for both past and present time intervals. In sum, the renderings may provide visualization of various characteristics of the cluster node as visual overlays disposed over an actual storage or compute node of the cluster that present basic diagnostic (and, in some embodiments, heartbeat) information by telemetry of the failed node on a display of the ARD tool via a display, e.g., a wearable AR screen, such as an AR headset.

In an embodiment, the ARD application 160 may interact with several telemetry sources (e.g., the failed node, administrative nodes of the cluster and, illustratively, the cloud-based diagnostic service 124) to receive requested telemetry data and provide diagnostic information. For instance, the API 228 of the operating system 225 may provide updates of most recent activity for selected predetermined time intervals (e.g., 5 seconds). Cloud telemetry data such as, e.g., predictive analytics, may be provided by the cloud-based analytics service 122 on different predetermined time interval (e.g., 5-minute is to multi-month) updates. These telemetry sources may be accessed from the ARD application 160 on-demand via standard communication protocols, such as HTTPS.

The requested telemetry data from the sources may be rendered on the wearable visualization technology 370 (e.g., AR screen) and presented as, e.g., histogram overlays in the field of view of the technician such that the technician simultaneously sees the actual hardware node overlaid with the analytics information on the screen. For example, the histograms may render data transfer rate history, latency history, etc. In an embodiment, the ARD application 160 may provide a zoom capability from historical to real-time data, so that when the technician zooms in on a histogram to display the most real-time rendering, data is pulled from the operating system API 228. When the technician zooms out to a day/month granularity, the data may be pulled from the analytics service 122, e.g., short-term analytics servers, and when fully zoomed out, pulled from long-term analytics servers of the service 122. Notably, the analytics service 122 is configured to receive data regarding the parameters of components of the nodes of the cluster and organize (e.g., archive and migrate) the data temporally among one or more analytics servers, e.g., short-term analytics servers for data gather during a current calendar week and long-term analytics servers for data greater than 2 calendar weeks old.

The wearable visualization technology 370 may be sensitive to various locations on both the front panel 340 and back panel 345 of the failed node 200. Typically, the back panel 345 of the node contains several network (connection) ports 350. In an embodiment, a front panel view diagnostic result may recommend proceeding to the back panel 345 of the failed node for deeper diagnostics, so that the technician may position to the back panel, point the display of the ARD tool 150 to focus on the network ports 350, and lock on to the ports for deeper analysis. Information and diagnostics pertaining to the network ports 350, such as data and port management information, may be rendered on the wearable visualization technology 370 (e.g., AR screen) by moving depicted cross hairs over the ports in the technician's field of view to lock on to a specific port. In this manner a gesture by the technician using the field of view may select a component on a node back panel (e.g., moving a head-mounted AR display using depicted cross hairs is over the component). For example, if the displayed port information includes analysis of a detected latency problem, the technician may be referred to repair recommendations to resolve the issue. That is, the ARD tool may reflexively display information (i.e., identifier, parameters, etc.) regarding components as they are targeted in the field of view, i.e., a type of AR "mouse-over."

In an embodiment, the AR infrastructure may enhance problem detection and resolution of the failed node by enabling the technician to forward (i.e., stream) information relating to a diagnostic analysis of the failure from the ARD application 160 to vendor-specific support engineering to facilitate a resolution of the problem, e.g., by confirming an order of specific parts and/or providing on-hand recommendations and/or alternatives to repair the node (i.e., quickly get the node back online). Additionally, the diagnostic analysis as well as the overall problem detection and resolution experience may be recorded by the ARD application 160 and uploaded, e.g., via a HTTPS connection 375, to a predictive analytics database 380 of the cloud-based analytics service 122 (FIG. 3) for inclusion in archival of HCI cluster historical artifacts for future reference as needed. The ARD tool 150 thus enables an in-field technician to perform initial analysis and self-diagnosis of storage and/or compute node failure in a HCI cluster, capture information relating to the analysis and diagnosis, and stream the captured information to a predictive analytics service 122 for future reference in a historical database 380 related to the HCI cluster 175. From the perspective of the database, the stream represents integration of an AR analysis input source from the ARD tool 150 with the predictive analytics service. As a result, reliable operation of the cluster is increased, down time is reduced, and suboptimal operation rectified, such as increasing network throughput by alleviating bottlenecks otherwise unforeseen, but for information integrated from the database.

Figure 5:
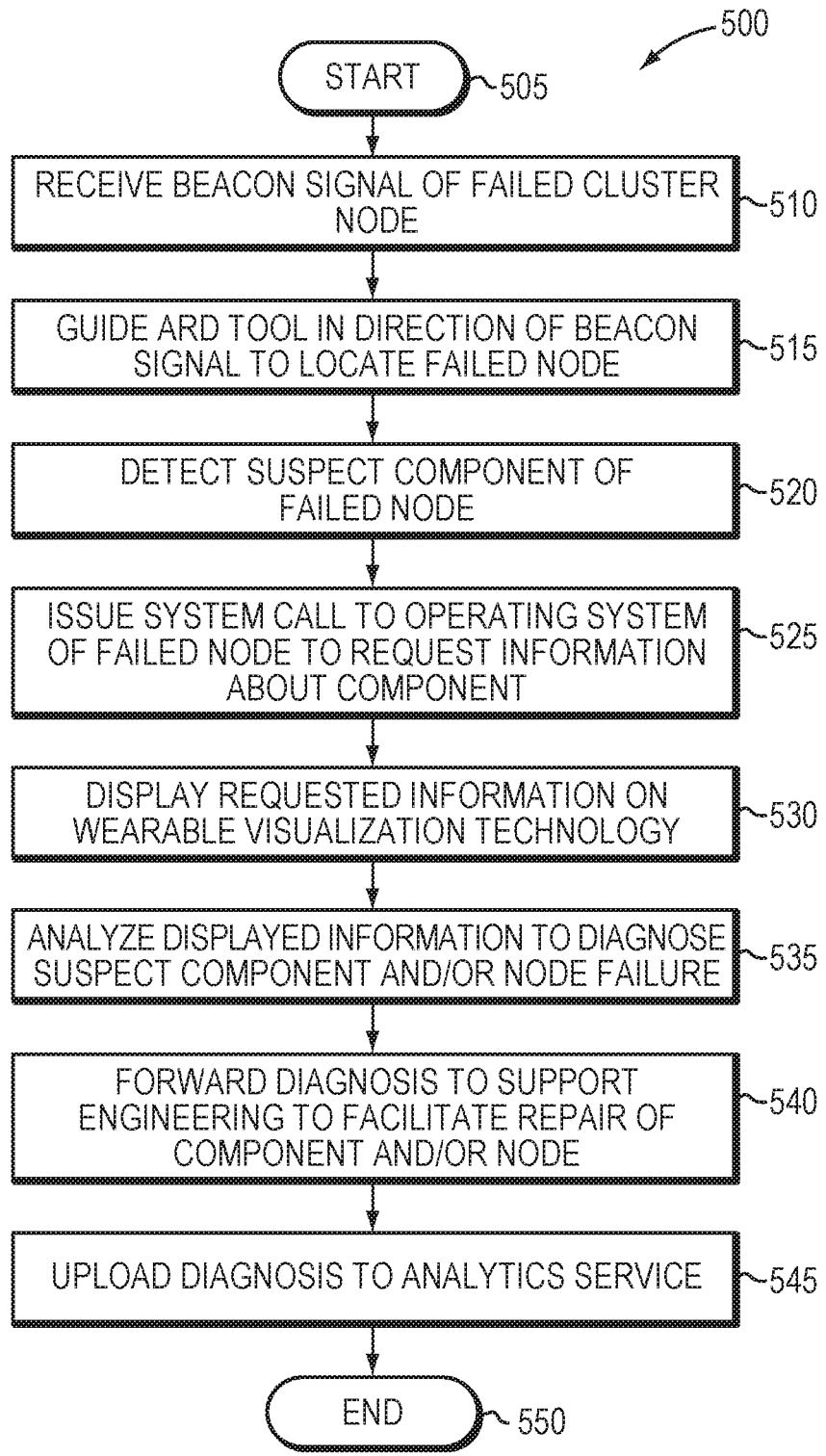
FIG. 5 illustrates an exemplary simplified procedure for utilizing the ARD tool to locate, diagnose and provide recommendations to repair a failed node of the cluster.

FIG. 5 illustrates an exemplary simplified procedure for utilizing the ARD tool (and ARD application) to locate, diagnose and provide recommendations to repair a failed node of the HCI cluster. The procedure 500 starts at block 505 and proceeds to block 510 where the ARD application of the ARD tool receives a transmitted beacon signal, including the node ID, of the failed node in the cluster. At block 515, the ARD is application guides the ARD tool (i.e., a user of the tool) in the direction of the transmitted beacon signal to locate the failed node in the cluster in accordance with the proximity analysis feature of the AR infrastructure (e.g., determining a relative signal strength of the beacon signal). At block 520, the ARD application invokes the image detection feature of the AR infrastructure to detect and lock onto one or more components (i.e., identify the component within the node, such as an operating system device identification) of the node suspected to be the cause of the failure. At block 525, the ARD application issues one or more system calls to the operating system of the node to request information about the component. At block 530, the requested information is displayed on the visualization technology of the ARD tool as a, e.g., wearable visual overlay disposed over an image of the node. At block 535, the displayed information is analyzed, e.g., by the ARD application optionally with information from the analytics service 122, to provide a diagnosis of the suspected component and/or node failure and, at block 540, the diagnosis is forwarded from the ARD application to vendor-specific support engineering to facilitate resolution and repair of the component and/or node. At block 545, the ARD application uploads the diagnosis to a predictive analytics database of the cloud-based analytics service for future reference, and the procedure ends at block 550.

While there have been shown and described illustrative embodiments for providing an ARD tool that employs AR infrastructure to enable a technician to locate and repair a failed node of an HCI cluster in a data center, it is to be understood that various other adaptations and modifications may be made within the spirit and scope of the embodiments herein. For example, embodiments have been shown and described herein with relation to training of the ARD application to identify components, such as network ports, embedded in the panels of the node to enable analysis of data velocity parameters of the ports. However, the embodiments in their broader sense are not so limited, and may, in fact, allow for identification of other node components and analysis of other parameters associated with those components.

For instance, the ARD application 160 may be trained to identify storage devices (such as SSDs 270) within the storage array 190 connected to the node 200. The image is detection feature of the AR infrastructure may also allow the ARD application of the ARD tool 150 to lock onto the SSDs 270 and issue API calls 360 to the operating system 225 of the node to request information pertaining to failure rates of the SSDs, e.g., how many SSDs of a specific type failed over a predetermined time interval and at what rate. The requested information may then be rendered as a false-color map, i.e., a "heat map," visual overlay disposed over the storage array 190 and displayed on the wearable visualization technology 370 of the ARD tool 150. The heat map may be further embodied as a "live" map configured to display failure (and correction) rates of the SSDs 270 in real-time.

In addition, the ARD application 160 may be trained to identify circuit boards (not shown) within the node 200 and, in particular, buses connecting storage devices. The image detection feature may allow the ARD application and tool to lock onto the boards and issue API calls 360 to the operating system 225 to request information pertaining to, e.g., signal congestion on the buses. The congestion may be visualized via overlays on the wearable visualization technology 370 using 3D models of the circuit boards to enable isolation of the circuit board in the node and subsequent debugging at the circuit board level. The ARD application 160 may be configured to instruct the technician (e.g., step-by-step) during node disassembly and circuit board debug.

Advantageously, the ARD application 160 and associated AR infrastructure described herein provide an ARD tool 150 that enables a customer service field technician to quickly locate and self-diagnose a failed node in an HCI cluster 175 within the customer's data center. The ARD tool 150 provides AR visualization rendering of problem discovery and guidance to instruct the technician through repair of the node failure to effectively reduce the number of vendor engineering support engagements. In essence, the ARD tool 150 enables in-field technicians to perform in-house support failure repairs, thereby augmenting the technical capability of the technician through AR visualization infrastructure.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks, electronic memory, and/or CDs) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   providing a software application adapted for execution on a portable device operable by a user to locate nodes of a data center, wherein each node includes a beacon utility having a node identifier (ID) such that the beacon utility emits a steady beacon signal including the node ID;
   in response to a malfunction of a node, activating the software application of the portable device with the node ID, the software application configured to guide the user in a direction of the malfunctioning node by detecting the steady beacon signal;
   displaying diagnostic information from telemetry of the malfunctioning node on visualization technology of the portable device by rendering the diagnostic information as a visual overlay disposed over an image of the malfunctioning node within a field of view of the user;
   detecting one or more components of the malfunctioning node by performing image detection on an image of an outer perimeter of the malfunctioning node;
   identifying a suspect component protruding through a panel of the outer perimeter of the malfunctioning node by locking onto the component using the node ID; and
   issuing one or more system calls to an operating system of the malfunctioning node to request the diagnostic information about the identified suspect component.

2. The method of claim 1 wherein rendering the diagnostic information as a visual overlay further comprises moving cross hairs depicted over the identified suspect component in the field of view.

3. The method of claim 1 wherein rendering the diagnostic information as a visual overlay further comprises rendering the diagnostic information as parameters of the identified suspect component in one or more of geometric shapes, dimensions and colors.

4. The method of claim 3 wherein the parameters are rendered as multi-dimensional bar charts and color-coded to represent predetermined units for past and present time intervals.

5. The method of claim 3 wherein the parameters are rendered as histograms overlaid in the field of view.

6. The method of claim 5 wherein the histograms render one of data transfer rate history and latency history.

7. The method of claim 5 wherein displaying the diagnostic information comprises providing a zoom capability from historical to real-time data, such that when zooming in on a histogram to display a real-time rendering, data is pulled from the operating system.

8. The method of claim 5 wherein displaying the diagnostic information comprises providing a zoom capability from historical to real-time data, such that when zooming out on a histogram to one of a day and month granularity, data is pulled from short-term servers of an analytics service.

9. The method of claim 5 wherein displaying the diagnostic information comprises providing a zoom capability from historical to real-time data, such that when fully zooming out on a histogram, data is pulled from long-term servers of an analytics service.

10. A non-transitory computer-readable storage medium embodying a set of instructions, which when executed by a processor of a portable device cause the portable device to:
    guide a user of the portable device in a direction of a malfunctioning node within a data center by detecting a beacon signal emitted by the malfunctioning node, wherein the beacon signal includes a node identifier (ID) associated with the malfunctioning node;
    display diagnostic information from telemetry of the malfunctioning node on visualization technology of the portable device by rendering the diagnostic information as a visual overlay disposed over an image of the malfunctioning node within a field of view of the user;
    detect one or more components of the malfunctioning node by performing image detection on an image of an outer perimeter of the malfunctioning node;
    identify a suspect component protruding through a panel of the outer perimeter of the malfunctioning node by locking onto the component using the node ID; and
    request the diagnostic information about the identified suspect component from the malfunctioning node.

11. The non-transitory computer-readable storage medium of claim 10, wherein said rendering the diagnostic information as a visual overlay further comprises rendering the diagnostic information as parameters of the identified suspect component in one or more of geometric shapes, dimensions and colors.

12. The non-transitory computer-readable storage medium of claim 11, wherein the parameters are rendered as multi-dimensional bar charts and color-coded to represent predetermined units for past and present time intervals.

13. The non-transitory computer-readable storage medium of claim 11, wherein the parameters are rendered as histograms overlaid in the field of view.

14. The non-transitory computer-readable storage medium of claim 13, wherein the histograms convey information regarding one or more of data transfer rate history and latency history.

15. The non-transitory computer-readable storage medium of claim 13, wherein display of the diagnostic information comprises providing a zoom capability from historical to real-time data, and wherein responsive to zooming in on a histogram to display a real-time rendering, data is pulled from the operating system.

16. The non-transitory computer-readable storage medium of claim 13, wherein display of the diagnostic information comprises providing a zoom capability from historical to real-time data, and wherein responsive to zooming out on a histogram to one of a day and month granularity, data is pulled from short-term servers of an analytics service.

17. The non-transitory computer-readable storage medium of claim 13, wherein display of the diagnostic information comprises providing a zoom capability from historical to real-time data, and wherein responsive to fully zooming out on a histogram, data is pulled from long-term servers of an analytics service.

18. A portable device comprising:
a processor;
a non-transitory computer-readable medium, coupled to the processing resource, having stored therein instructions that when executed by the processor cause the portable device to:
  guide a user of the portable device in a direction of a malfunctioning node within a data center by detecting a beacon signal emitted by the malfunctioning node, wherein the beacon signal includes a node identifier (ID) associated with the malfunctioning node;
  display diagnostic information from telemetry of the malfunctioning node on visualization technology of the portable device by rendering the diagnostic information as a visual overlay disposed over an image of the malfunctioning node within a field of view of the user;
  detect one or more components of the malfunctioning node by performing image detection on an image of an outer perimeter of the malfunctioning node;
  identify a suspect component protruding through a panel of the outer perimeter of the malfunctioning node by locking onto the component using the node ID; and
  request the diagnostic information about the identified suspect component from the malfunctioning node.

19. The portable device of claim 18, wherein said rendering the diagnostic information as a visual overlay further comprises rendering the diagnostic information as parameters of the identified suspect component in one or more of geometric shapes, dimensions and colors.

20. The portable device of claim 18, wherein the parameters are rendered as multi-dimensional bar charts and color-coded to represent predetermined units for past and present time intervals.

\* \* \* \* \*